United States Patent

Draper et al.

Patent Number: 5,973,269
Date of Patent: Oct. 26, 1999

[54] MULTI-LAYER INSULATION FOR WINDING ELEMENTS OF DYNAMOELECTRIC MACHINES (D.E.M.S)

[75] Inventors: Robert Edward Draper, Peterborough; Luc Jean Joseph Lafortune, Laval; Michael Beapré, Beloeil; Bernard John Moore, Peterborough, all of Canada

[73] Assignee: General Electric Canada Inc., Mississauga, Canada

[21] Appl. No.: 08/633,055

[22] Filed: Apr. 16, 1996

[51] Int. Cl.$^6$ .................................................. H01B 7/34
[52] U.S. Cl. ................................ 174/120 R; 174/124 R; 310/43; 310/45
[58] Field of Search ........................ 174/120 R, 120 C, 174/120 SR, 122 R, 124 R; 310/43, 45

[56] References Cited

U.S. PATENT DOCUMENTS

| | | | |
|---|---|---|---|
| 4,085,250 | 4/1978 | Smith | 428/418 X |
| 4,356,417 | 10/1982 | Smith et al. | 310/43 |
| 4,399,190 | 8/1983 | Iwabuchi et al. | 428/336 X |
| 4,405,553 | 9/1983 | Lovgren et al. | 264/272.19 |
| 4,640,086 | 2/1987 | Levino | 57/3 X |
| 4,675,235 | 6/1987 | Wu | 428/363 X |
| 5,079,077 | 1/1992 | Sakayanagi et al. | 428/237 X |

*Primary Examiner*—Bot L. Ledynh
*Assistant Examiner*—Chau N. Nguyen
*Attorney, Agent, or Firm*—E. Oldham

[57] ABSTRACT

An insulation system for the windings of a dynamoelectric machine is described wherein a bundle of insulated conductors is provided with layers of groundwall insulation. The innermost layer of groundwall insulation has superior corona discharge resistant properties. A second layer of groundwall insulation which has a corona discharge resistance somewhat less than the innermost layer of groundwall is superimposed on the innermost layer.

3 Claims, 3 Drawing Sheets

MULTI-LAYER INSULATION FOR WINDING ELEMENTS OF DYNAMOELECTRIC MACHINES (D.E.M.S)

This application relates to a method of insulating electrical coils of a dynamoelectric machine using insulation layers of insulating tape having differing insulating characteristics and qualities and more particularly layers having differing corona withstand capabilities. The cost of the layers of insulation applied to the coils or half coils of dynamoelectric machines varies in accordance with the cost of production of each variety of insulation, and as expected, the insulating medium which offers the most attractive capabilities from an insulation point of view is generally the costliest. At the present time, most manufacturers who are attempting to provide an effective insulating layer on large AC dynamoelectric machine winding elements would probably defer to a composite corona resistant polyimide insulation which is loaded with a corona resistant material, such as for instance, finely divided aluminum oxide, which is bonded or somehow joined to a mica tape layer to form a unitary insulating medium in the form of a sandwich tape.

While such insulating tapes are superior performers, it has been found that these expensive layers of insulating material may be used in combination with less costly layers of other types of insulation without impairing the overall performance of the insulation applied to the winding element.

BACKGROUND OF THE INVENTION

The designers of insulation systems for large high voltage AC dynamoelectric machines have faced a constant challenge over the last century, and that is to provide a machine which will operate at higher and higher voltages whilst keeping the layers of insulating material on the critical electrical conducting parts to a minimum thickness. To meet the challenge, designers have utilized mica in a variety of forms from large flake dispersed on a backing material, to the product known as mica paper which is a product made from tiny mica flakes which are incorporated into a product which nearly resembles paper, and in fact is made by a process which is very similar to a process used for making paper from pulp fibers.

Mica by its very nature has physical properties which make it intractable for use in an insulation system. However, its superior corona breakdown resistance has provided the incentive that insulation system designers needed to overcome the obstacles created by its unattractive physical qualities. Today, mica paper enjoys an unchallenged position as being one of the most corona discharge resistant materials known to mankind.

Mica paper has an inherently low tensile strength and the tiny mica flakes composing the paper tape used in most mica paper insulation tend to flake from the body of the tape as it is wound on the winding elements, which will subsequently become a part of an AC machine. As a result, insulation designers currently bond the mica paper to another insulating medium, traditionally glass fibers which will improve the tensile strength of the mica paper and the backing tends to prevent the shedding of mica flakes from the mica tape during a winding operation.

At the present time, a composite insulation which has exceptional insulation qualities and good corona discharge resistance is a CR KAPTON® (trademark of DuPont) insulating film, which is used as a backing on a mica paper, glass fiber composite tape. The addition of enhanced corona resistant materials yields an overall insulation system which is electrically more robust than standard systems. Experimentation has shown that by strategically locating the highly corona resistant materials in the high electrically stressed locations, the resultant hybrid system becomes dielectrically superior (higher volt per mil capability) than either a fully corona resistant system or a standard system. The resulting system has the added advantage of being less costly than a fully corona resistant enhanced system.

SUMMARY OF THE INVENTION

This invention relates to an insulation system which combines an expensive enhanced corona resistant composite insulating tape with a much less inexpensive but, however less corona resistant composite insulating tape such that the expensive, enhanced corona resistant composite insulating tape may be utilized in areas of high voltage stress and the less expensive corona resistant composite tape may be utilized in areas where the voltage stress is somewhat diminished.

This insulation system satisfies the current movement toward a reduction in overall insulation thickness on the conductive components of a machine, which is ultimately subjected to an increasing dielectric stress. If the final build thickness on the conductive parts can be successfully reduced, the machine efficiency may be increased. This invention seeks to strike a cost benefit balance between the utilization factor resulting from the dielectric characteristics of both component insulation systems.

RELEVANT PRIOR ART

Canadian Patents 714,637 Jul. 27, 1965 1,329,519 May 17, 1994

U.S. Patent Nos. 4,399,190 Aug. 16, 1983 4,760,296 Jul. 26, 1988

DESCRIPTION OF THE PREFERRED EMBODIMENT

Figure 1A:
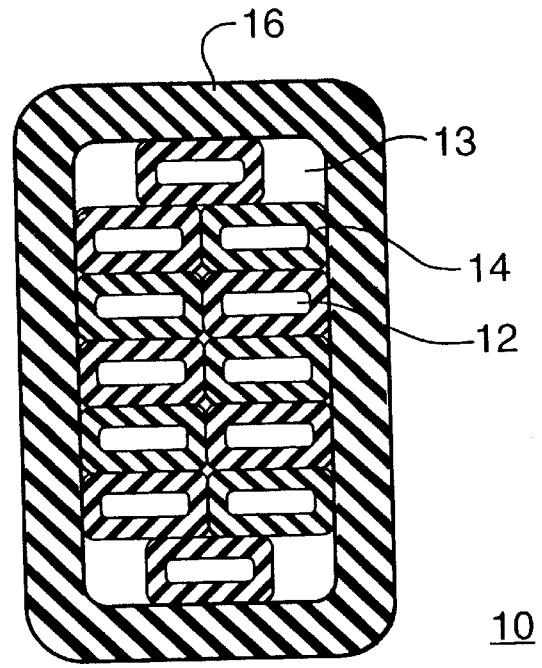
FIG. 1A shows the cross section of a typical stator bar for a large AC dynamoelectric machine.

FIG. 1 shows a cross section of a typical stator bar 10 for a large AC dynamoelectric machine. Bar 10 is composed of a large number of insulated conductors such as 12 which are insulated from each other by the strand insulation 14.

The conductors 12 are formed into a group after having strand insulation 14 applied thereto to provide the necessary isolation. The top and bottom surfaces of the conductor group are filled with an insulating material 13 generally referred to as a transposition filler. The group of insulated conductors 12 are next wrapped with a groundwall insulation material 16. The number of layers of insulating tape making up insulation may be from 7 to 16 layers of a mica tape insulation wound in half lap fashion, depending on the level of operating voltage to which the conductors 12 are being subjected.

For high voltage applications, that is for voltages above 4000 volts, the preferred groundwall insulation 16 would be layers of a composite mica tape comprising a corona discharge resistant polyimide bonded to a mica type paper tape. This tape provides a good layer of insulation, and because of its corona resistant properties, provides long service life because of the resistance to corona discharge. The mica paper composites and tapes used in these hybrid systems contain a high percentage of a semi-cured resin (resin rich) which may or may not contain a corona resistant material. The wrapped bar is heated and compressed, in an autoclave or press, to allow the resin to temporarily liquefy so as to evacuate any entrapped air and eliminate any voids. Heat and pressure are maintained on the bar undergoing treatment so that the resin contained in the insulation is driven to gelation, bonding the insulation system together. The surface of the cured bar may next be coated with suitable materials to assure that the entire exposed surface of the bar will form an equipotential surface during machine operation.

The cured bar manufactured with the tape types as described above will function acceptably well within the design parameters of the machine for a predetermined period of time.

Figure 1B:
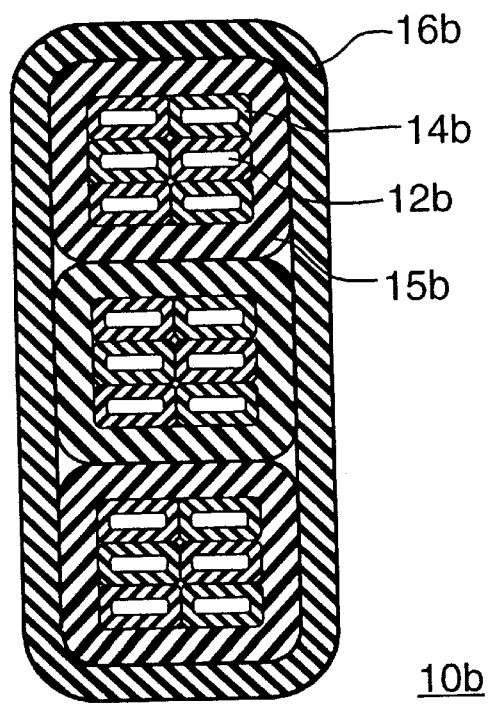
FIG. 1B shows the cross section of a typical stator coil for a large AC dynamoelectric machine.

FIG. 1B shows the cross section for a typical coil 10b. In this instance, stands 12b of copper (six shown) are grouped together so that although strands 12 are separated from each other by the presence of strand insulation 14b, the six strands grouped into the turn, must be insulated from the other turns of the coil 10b by means of turn insulation 15b. The turn package is ultimately covered with groundwall insulation 16b.

Figure 2A:
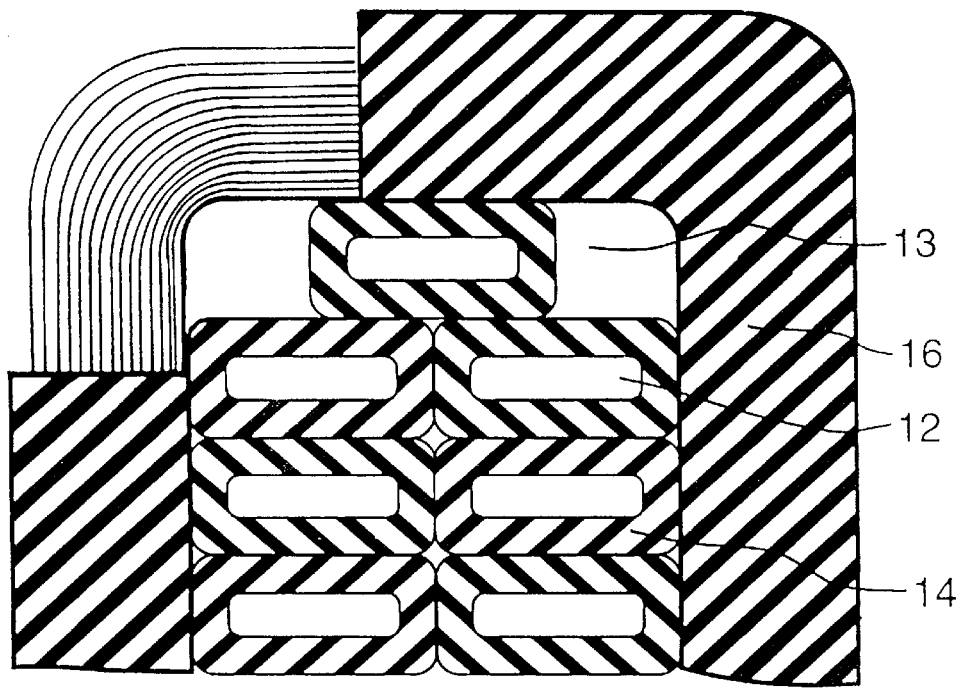
FIG. 2A shows a plot of the equipotential surfaces surrounding the stator bar as shown in FIG. 1A.

FIG. 2A shows a partial section of the stator bar of FIG. 1A and the equipotential lines as they exist at the various distances from the turn conductor bundle. It will be noted that the voltage stress concentration is much greater in the area nearest the conductor bundle and is especially intense at the corner of the bundle (typically 135 volts/mil at inside comer and 65 volts/mil at outside).

Figure 2B:
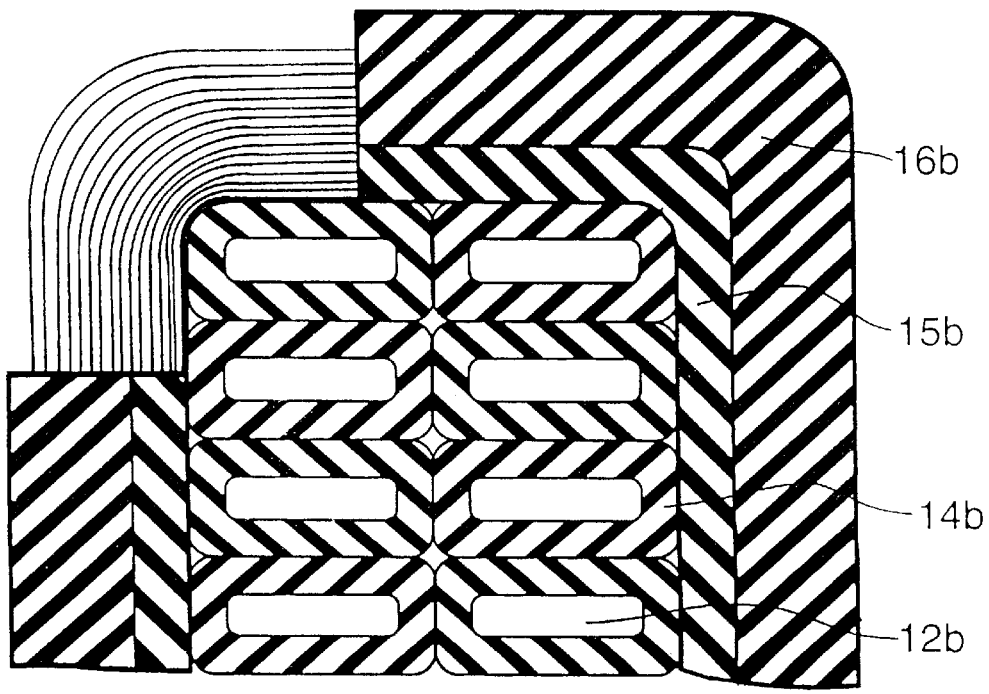
FIG. 2B shows the plot of the equipotential surfaces surrounding the stator coil of FIG. 1B.

FIG. 2B shows a partial section of the stator coil of FIG. 1B with the equipotential lines illustrating the dielectric stress. Note the similarity with FIG. 2A.

This invention seeks to insulate the first several layers of insulating medium surrounding the conductor bundle with a polyimide film backed mica tape wherein the polyimide is loaded with a corona discharge resistant material such as fumed aluminum oxide and sold as CR KAPTON® (a trademark of DuPont).

Figure 3A:
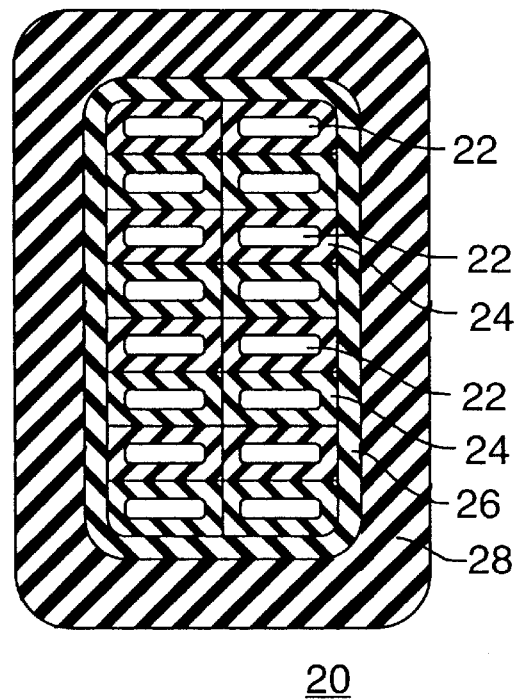
FIG. 3A shows an insulating system for the stator bar of FIG. 1A using the insulating system of this invention.

FIG. 3A shows the cross section of a stator bar insulated in accordance with the teachings of this invention. Here the conductor bundle is composed of individual conductors 22 separated by turn to turn insulation 24 similar to that as previously shown in FIG. 1A. The conductor bundle is next wound with several layers of a composite tape comprising a mica tape (or some other acceptable material) backed with a corona discharge resistant polyimide to form layer 26 to build up to the required thickness to be present in areas where the voltage stress concentration is the greatest. For most stator bars, the layer 26 will have a thickness of about one third of the overall thickness of the groundwall insulation medium. The two layers will generally carry a resin impregnant similar to that described earlier in FIG. 1A in association with groundwall insulation 16.

The balance of the groundwall may be layers of half lapped tape composed of a composite such as mica paper backed on a glass tape backing to form layer 28. A suitable resin impregnant may be present in the mica paper. This standard tape has an excellent voltage withstand capability but suffers from a corona discharge resistance which is inferior to the tape forming insulation layer 26. If the intense voltage stress is concentrated on layer 26, the layer 28 will adequately serve to provide the protection from the dielectric stress required by the groundwall insulation system and because the voltage stress concentration has been dealt with by layer 26, the overall groundwall insulation system is still quite functional and much less expensive than if insulation layer 26 had been employed exclusively for the groundwall insulation system. The insulation of FIG. 3 is functional and cost efficient and thus provides a more effective and efficient groundwall insulation layer.

The groundwall insulation comprising layers 26 and 28 may be subjected to press curing or an autoclaving curing process to eliminate any voids in the insulation layers 26 and 28 and to subsequently drive the resin impregnant to gelation.

Suitable surface coatings may be applied to the external surface of insulation layer 28 once it is cured.

Figure 3B:
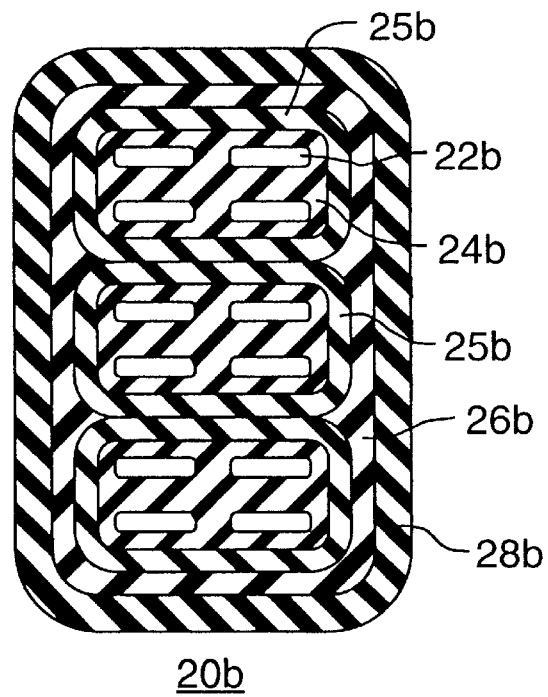
FIG. 3B shows an insulating system for a stator coil of FIG. 1B using the insulating system of this invention.

FIG. 3B shows the composite groundwall insulation as it applies to coil 20 composed of three turns. In this instance, the copper conductors 22b are surrounded by strand insulation 24b. The turn insulation 25b is applied to each turn and the initial layer of groundwall insulation 26b containing the same constituents as layer 26 in FIG. 3A is applied. Finally, the layer of outer groundwall insulation 28b is applied. With the exception of the presence of the turn insulation 25b, the insulation systems of FIGS. 3A and 3B are very similar.

In summary, a groundwall insulation is disclosed which utilizes a pair of insulating materials in a most efficient manner. The material which has excellent voltage withstand capability for the long and short term (i.e. good corona discharge resistance) has been chosen to be present where the voltage stress is most critical. A preferred insulating tape for this layer will definitely have a corona resistant layer such as CR KAPTON® layer in its constituents. The tape envisaged for this layer would be a mica tape which is resin rich, where the resin is preferably filled with a corona resistant material such as silicon or aluminum oxide. An additional layer of glass fiber material may be incorporated into the composite tape (corona resistant material plus mica layer) in the inner layer 26. The outer layer such as layer 28 of FIG. 3A will not have the expensive component such as CR KAPTON® in its composite layer. This composite tape will have a resin rich mica tape (where the resin may or may not contain a corona resistant filler) bonded to a glass fiber backing in a woven or mat form.

As those skilled in the art are aware, alterations in the components of the tapes are to be expected, but the presence of the corona resistant layer in the tape employed in the inner most layer of the groundwall insulation system is essential to this invention. Applicant has been able to eliminate this costly constituent from the insulation applied to the outer layer of the groundwall system without any significant compromise in the performance of the overall groundwall insulation system.

We claim:

1. A winding element for use in a high voltage dynamoelectric machine comprising a bundle of insulated turn conductors surrounded by a layer of groundwall insulation wherein the groundwall insulation comprises an inner and outer layer each having differing corona discharge resistant capabilities wherein:

said inner layer of said groundwall insulation comprises several layers of either wrapped or lapped insulting tape having superior corona discharge resistant properties and, said outer layer of said groundwall insulation wound over said inner layer of said groundwall insulation, said outer layer comprises several layers of wrapped or lapped insulating tape having corona discharge resistant properties lesser than those of the tape comprising said inner layer of said groundwall insulation and wherein said inner layer comprises layers of a composite mica tape laminate having layer of tape whose major constituent is a polymeric tape loaded with particles of a corona discharge resistant material bonded to a resin rich mica tape, and said outer layer comprises a mica tape composite having mica tape backed with layer of glass fiber material.

2. A winding element as claimed in claim 1 wherein the mica tape composite contains a resin rich mica paper layer.

3. A winding element as claimed in claim 2 wherein said inner and outer layers are impregnated with resin which contains particles of a corona discharge resistant material.

* * * * *